United States Patent
Le Meur et al.

(10) Patent No.: US 9,991,919 B2
(45) Date of Patent: Jun. 5, 2018

(54) DIGITAL DETECTION METHOD

(71) Applicant: THALES, Courbevoie (FR)

(72) Inventors: Anne Le Meur, Elancourt (FR); Jean-Yves Delabbaye, Elancourt (FR)

(73) Assignee: THALES, Courbevoie (FR)

( * ) Notice: Subject to any disclaimer, the term of this patent is extended or adjusted under 35 U.S.C. 154(b) by 0 days. days.

(21) Appl. No.: 15/303,723

(22) PCT Filed: Apr. 10, 2015

(86) PCT No.: PCT/EP2015/057807
§ 371 (c)(1),
(2) Date: Oct. 12, 2016

(87) PCT Pub. No.: WO2015/158615
PCT Pub. Date: Oct. 22, 2015

(65) Prior Publication Data
US 2017/0033822 A1    Feb. 2, 2017

(30) Foreign Application Priority Data

Apr. 18, 2014  (FR) ..................................... 14 00935

(51) Int. Cl.
| | |
|---|---|
| *H04L 27/06* | (2006.01) |
| *H04B 1/26* | (2006.01) |
| *G06F 17/18* | (2006.01) |
| *H04B 1/719* | (2011.01) |
| *H04B 7/08* | (2006.01) |
| *G01S 7/02* | (2006.01) |
| *G06F 17/14* | (2006.01) |

(52) U.S. Cl.
CPC ................ *H04B 1/26* (2013.01); *G01S 7/021* (2013.01); *G06F 17/18* (2013.01); *H04B 1/719* (2013.01); *H04B 7/0848* (2013.01); *G06F 17/141* (2013.01)

(58) Field of Classification Search
CPC ......................................................... H04B 1/26
USPC ......................................................... 375/340
See application file for complete search history.

(56) References Cited

U.S. PATENT DOCUMENTS 5,627,546 A  *  5/1997  Crow .................... G01S 13/765
                                                            342/32
7,482,967 B2    1/2009  Beharrell
(Continued)

OTHER PUBLICATIONS

S. P. Chepuri et al., "Multiple hypothesis testing for compressive wideband sensing," 2012 IEEE 13th International Workshop on Signal Processing Advances in Wireless Communications, Jun. 17, 2012, pp. 590-594, XP032231277.
(Continued)

*Primary Examiner* — Lihong Yu
(74) *Attorney, Agent, or Firm* — Baker & Hostetler LLP

(57) ABSTRACT

A passive detection method implemented by a device comprising one or more sensors comprises a step of sampling signals received by each sensor using various sub-Nyquist sampling frequency values, a step of transforming the sampled signals to the frequency domain by discrete Fourier transform, the frequency pitch ΔF being chosen constant, and, for each time/frequency box, a step of calculating the normalized power in each reception channel, a step of calculating the quadratic sum of the calculated powers while taking into account the power of a possible parasitic signal, and a thresholding step carried out so as to ensure a given probability of false alarm.

8 Claims, 5 Drawing Sheets

(56) References Cited

U.S. PATENT DOCUMENTS

2003/0058926 A1\* 3/2003 Balakrishnan ...... H04L 25/0204
　　　　　　　　　　　　　　　　　　　　　　　　　375/146
2010/0189161 A1\* 7/2010 Jallon ................. H04L 27/0012
　　　　　　　　　　　　　　　　　　　　　　　　　375/130

OTHER PUBLICATIONS

R. Venkataramani et al., "Optimal Sub-Nyquist Nonuniform Sampling and Reconstruction for Multiband Signals," IEEE Transactions on Signal Processing, vol. 49, No. 10, Oct. 2001, pp. 2301-2309, XP011059439.
D. Noguet et al., "Sensing techniques for Cognitive Radio-State of the art and trends, A White Paper, Apr. 15," vol. 1900.6, Jul. 17, 2009, pp. 1-117, XP068028971.
M. Mishali et al., "From Theory to Practice: Sub-Nyquist Sampling of Sparse Wideband Analog Signals," IEEE Journal of Selected Topics in Signal Processing, vol. 4, No. 2, Apr. 2010, pp. 375-391, XP011327603.
Z. Zhang et al., "Space-Time Bayesian Compressed Spectrum Sensing for Wideband Cognitive Radio Networks," IEEE Symposium on New Frontiers in Dynamic Spectrum, Apr. 6, 2010, pp. 1-11, XP031664835.
M. Dominguez-Jitnenez et al., "Analysis and design of multirate synchronous sampling schemes for sparse multiband signals," 2012 Proceedings of the 20th European IEEE Signal Processing Conference, Aug. 27, 2012, pp. 1184-1188, XP032254474.

\* cited by examiner

DIGITAL DETECTION METHOD

CROSS-REFERENCE TO RELATED APPLICATIONS

This application is a National Stage of International patent application PCT/EP2015/057807, filed on Apr. 10, 2015, which claims priority to foreign French patent application No. FR 1400935, filed on Apr. 18, 2014, the disclosures of which are incorporated by reference in their entirety.

FIELD OF THE INVENTION

The present invention relates to the field of wideband (of the order of about ten gigahertz width for example) passive reception of electromagnetic signals such as for example communication signals or radar signals. The present invention more particularly relates to a passive digital detection method.

BACKGROUND

For technological reasons, in the context of wideband (of the order of about ten gigahertz width for example) monitoring of electromagnetic signals, it is not generally possible to carry out sampling at a frequency meeting the Nyquist criterion, nor to process the data obtained by this sampling. This means that it is necessary to carry out sampling at frequencies lower than the Nyquist frequency, this creating problems with spectral overlap or aliasing.

If a single useful signal is present in the entirety of the analyzed band, this sampling technique does not create problems, neither as regards detection, since the signal is isolated in the aliased band, nor as regards signal analysis.

In contrast, if a plurality of signals are present simultaneously in the entire band, they may superpose in the aliased band, even if they are not in fact at the same frequency.

For very wideband systems for monitoring electromagnetic signals, such as for example communications signals or radar signals, it is not possible at the present time to simultaneously have a maximum probability of intercept and satisfactory analysis capabilities. The systems that perform these intercepts may be divided into two categories:

A first category corresponds to very wideband receivers. These receivers continuously cover the entire band to be analyzed and have a very high probability of intercept (POI) for strong signals, but are characterized by a low sensitivity and a very low ability to discriminate or analyze electromagnetic signals.

A second group corresponds to what are called "superheterodyne" narrowband receivers. These receivers, after multibit sampling of the band via a conventional method, allow refined analyses to be carried out on the signal (with a high sensitivity even allowing the modulation to be sought after discrete Fourier transform), but obviously suffer from a degraded POI since out of band signals are not processed. Sequencing functions that consist in determining the time to spend monitoring partial bands do exist but they only partially remedy this drawback.

In this context, it would be advantageous to provide a solution allowing the advantages of these two families of receiver to be combined. Such a solution would make it possible not only to permanently monitor a wideband but also to implement suitable two-or-more bit sampling in order to effectively process the received signals.

The conventional detectors found in the literature only take into account thermal noise. Thus, parasitic signals that are in fact themselves signals are not taken into account in the detection method.

Multibit sub-Nyquist wideband digital receivers are also known in the prior art, especially from U.S. Pat. No. 7,482,967. However, such systems do not treat possible problems with aliasing of other signals.

SUMMARY OF THE INVENTION

One aim of the invention is especially to correct one or more of the drawbacks of the prior art by providing a solution allowing one or more useful signals to be detected while nonetheless being robust to parasitic signals.

To this end, one subject of the invention is a method for passively detecting electromagnetic signals that is robust to aliasing, said method being implemented by a device comprising at least one antenna, said antenna comprising at least one sensor, and said method comprising:

a step of sampling signals received by each sensor, during a common acquisition time $\Delta T$, using M different sampling frequency values $f_m$ not meeting the Nyquist criterion, the signals sampled at a given frequency forming a sampling channel, M being an integer higher than or equal to 2 and m being the index of the sampling frequency, which index is comprised between 1 and M, at least two samples being taken with different sampling frequencies $f_m$ and different numbers $N_m$ of sampled points, the pair ($N_m$, $f_m$) being chosen such that the ratio $\Delta T = N_m / f_m$ remains constant whatever the index m, and a step of transforming the sampled signals to the frequency domain by discrete Fourier transform of the $N_m$ sampled points of the received signal, which points are sampled at $f_m$ over the common time interval $\Delta T$, the common spectral resolution of all the samples being $\Delta F = 1/\Delta T$, the signals being presented in a discrete time/frequency representation, the process furthermore comprises, for each time/frequency box of said discrete representation, a step of calculating the normalized power in each sampling channel, a step of calculating the quadratic sum of the calculated powers while taking into account the power of a possible parasitic signal, and a step of thresholding said quadratic sum using a preset threshold value.

According to one variant implementation, the quadratic sum S of the powers is calculated using the formula:

$$S = \sum_{m=1}^{M} y_m^2 - \ln\left[1 + \frac{\xi}{M} \sum_{m=1}^{M} \exp y_m^2\right]$$

Where: $y_m^2$ is the normalized power in the sampling channel of frequency $f_m$ $\xi$ translates the possible presence of a parasitic signal in one of the samples with $$\xi = \frac{1-\alpha}{\alpha}\left(\frac{\sigma^2}{\sigma_1^2 + \sigma^2}\right)^R$$

$2\sigma_1^2$ is the power of the possible parasitic signal,
$2\sigma^2$ is the power of the noise, α is the probability of there being no parasitic signal, and R is the number of channels sampled at the frequency $f_m$ According to one variant implementation, the method furthermore comprises a step of searching for the highest power value among the sampling channels, the quadratic sum being calculated while excluding said highest power value and by summing the remaining (M−1) powers, said highest power value being considered to be the power of a parasitic signal.

According to one variant implementation, the signals are received in N time/frequency boxes where N is an integer strictly higher than 1, the method furthermore comprising applying a non-linear function to each time/frequency box and a step of summing the results obtained in the N time/frequency boxes.

According to one variant implementation, the non-linear function is a monotonically increasing function the representative curve of which is defined by its asymptotes, a first asymptote at l=0 having the equation y=ql and a second asymptote for l→+∞ having the equation y=l+ln(q), where q is a real number comprised between 0 and 1.

According to one variant implementation, the threshold value is defined so as to ensure a preset probability of false alarm.

Another subject of the invention is a passive detection device comprising a receiving module comprising at least one antenna and a computing module configured to implement the method according to one of the preceding variants, said receiving module being configured to receive electromagnetic signals from the environment and to transmit them to the computing module with a view to their processing.

According to one variant embodiment, the receiving module comprises an interferometer antenna array.

BRIEF DESCRIPTION OF THE DRAWINGS

Other particularities and advantages of the present invention will become more clearly apparent on reading the following description, which is given by way of nonlimiting illustration and with reference to the appended drawings, in which.

DETAILED DESCRIPTION

It should be noted that the use of the terms "sample" or "sampling channel" designates all of the signals received by those receiving or measuring channels that are sampled at a given frequency.

The principle of the invention is based on taking into account the effect of spectral aliasing in the modelling and processing of the received signal, i.e. in the mathematical solution of the problem of wideband detection, in order to guarantee a detection performance as close as possible to that which would be obtained without spectral aliasing.

The passive digital detection method according to the invention may mainly comprise a step of sampling the signal received by each sensor with a plurality of sub-Nyquist frequency values, a step of filtering the signal with a bank of filters of the discrete Fourier transform type and for each time/frequency box, a step of calculating the normalized power of each sample, a step of calculating the quadratic sum of the calculated powers while taking into account the power of a possible parasitic signal and a step of thresholding using a preset threshold value. The threshold value may be defined in order to ensure a preset probability of false alarm (see Testing Statistical Hypothesis, E. L. Lehmann, J. P. Romano, Springer 2005).

The signal is received by an antenna or an interferometer antenna array. It will be seen below that the receiving device includes P sensors where P is a nonzero integer.

In a sampling step, the signals received by the various sensors are sampled with a plurality of different sub-Nyquist frequency values $f_m$ (where m is a natural integer varying from 1 to M, and where M is an integer higher than or equal to 2 representing the number of frequencies used), the term sub-Nyquist meaning that the Nyquist-Shannon criterion is not met. M must be high enough to allow frequency ambiguities to be removed and depends on the width of the analyzed band.

Signals sampled at a given sampling frequency $f_m$ form a sampling channel of index m.

It is assumed that for each m from 1 to M, R sensors are sampled at the frequency $f_m$.

The various sampling frequency values $f_m$ are chosen to meet two constraints:

each frequency $f_m$ is chosen so that its value is very much lower than the intercept band B of the signals but higher than the band of the signals to be analyzed; and the frequency $F_0$ of a pure sinusoid in the band B may be recovered without ambiguity from the M signals sampled at the frequencies $f_1, \ldots f_M$.

Thus, each sample preserves the shape of the spectrum of the useful signal to be analyzed, but translates said spectrum by a possible amount that depends on the value of the frequency $f_m$.

Thus, advantageously, a plurality of samples taken at the technologically possible frequencies $f_m$ replace conventional but impracticable sampling at the frequency 2B, at the price of more elaborate processing.

Figure 1A:
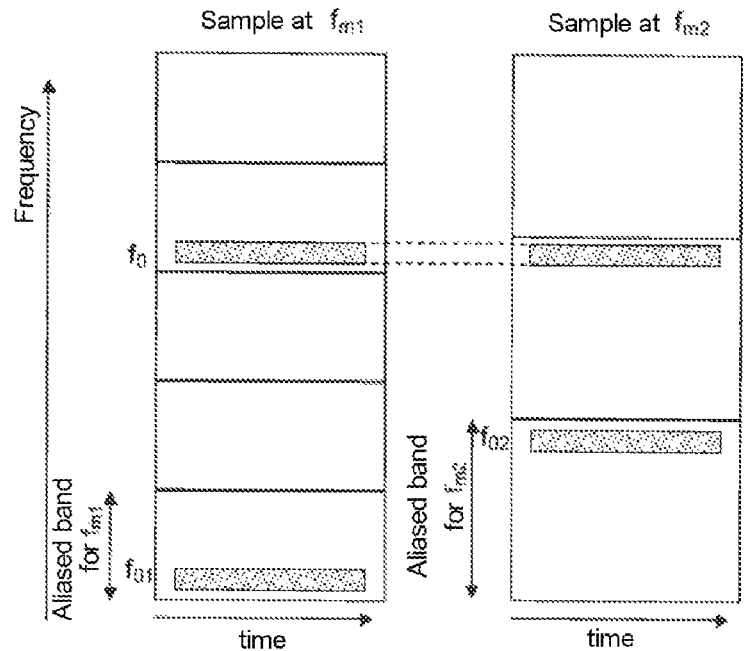
FIGS. 1a and 1b illustrate exemplary implementations of the sampling step respectively in a mono-signal configuration and with two sampling channels.

By way of example, FIG. 1a illustrates the sampling method in a monosignal configuration and with two sampling channels. It is a question of a simplified schematic diagram in which it is assumed that the spectrum of the analytical signals being processed does not have a negative frequency component.

Figure 1B:
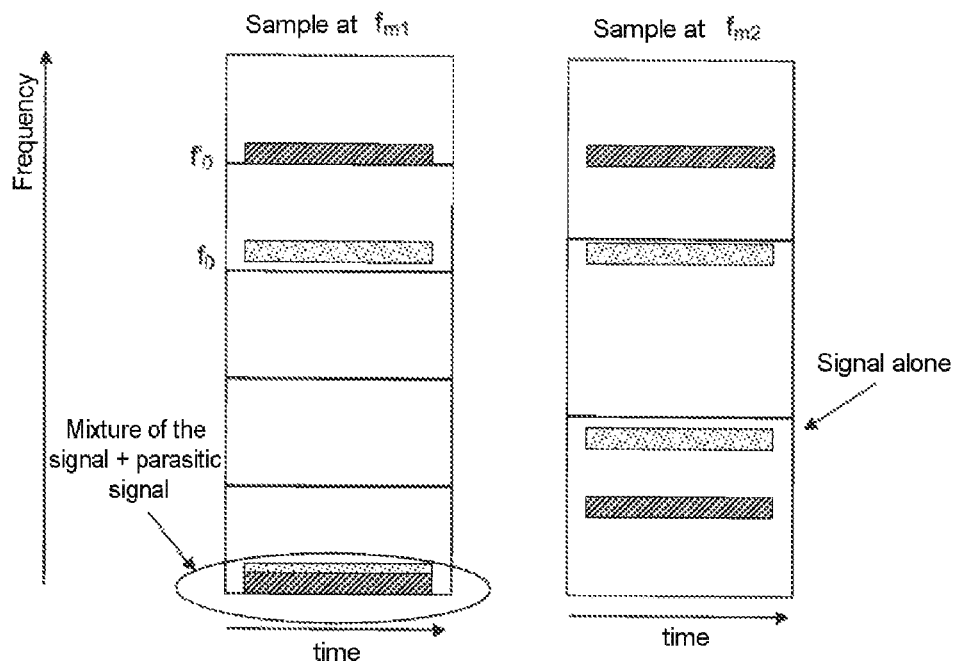

This type of sampling, which allows frequency ambiguity to be removed without needing to perform conventional sampling at the frequency 2B to meet the Nyquist criterion, is completely different to conventional signal reception models and requires more elaborate processing, especially at the detection stage. Specifically, in the entirety of the processed band B, it is possible for signals to be received simultaneously during the implementation of the discrete Fourier transform (or DFT). It is possible, in one or more samples, for this simultaneity to be interpreted as a mixing. By way of illustration, this case is shown in FIG. 1b.

If one useful signal has the frequency $f_0$ and the other useful signal the frequency $f'_0 = f_0 + k \cdot f_{m1}$, where k is a strictly positive or strictly negative integer (if k were zero the mixing would not be an artefact but red) and where $f_{m1}$ is one of the M different sampling frequency values, the frequencies of the two signals alias to the same place in the sample $f_{m1}$.

In other words, the 2 M-tuples representing the frequencies $f_0$ and $f'_0$ in the M sampling channels have one common value. A mixing of signals is measured in the sample $f_{m1}$, whereas in fact there is no mixing. The signal at the frequency $f_0$, although itself a useful signal, represents a parasitic signal with respect to the signal at the frequency $f_0$.

When a parasitic signal aliases in one of the M channels corresponding to the frequency $f_0$, whereas no signal is present at the frequency $f_0$, the presence of the parasitic signal may generate a false alarm. In a dense environment, the probability of a parasitic signal being present is non-negligible, about 10% or even higher, and incompatible with the performance required from most receiving systems.

Next, a discrete Fourier transform is applied to the $N_m$ sampled points of the received signal, which points are sampled at $f_m$ over an acquisition time $\Delta T$ that is common to each and every sensor. $\Delta F = 1/\Delta T$ is then the common spectral resolution of all the samples. In order to obtain synchronous information of the same spectral resolution, it is necessary, for the various sampling frequencies $f_m$, to use numbers $N_m$ of DFT points respecting:

$$N_m \cdot T_m = \Delta T = 1/\Delta F$$

where: $N_m$ is the number of points sampled at the frequency $f_m$;
$T_m$ is the sampling period at the frequency $f_m$; and
$\Delta F$ is the frequency pitch of the DFT (independent of m).

This implies that the number $N_m$ of points is different from one sample to the next. This choice of the sampling frequencies $1/T_m$ so that they are multiples of the band $\Delta F$ implies that from one sample to the next, the spectra of the signals are shifted by an integer number of filters.

The following phase consists in modelling the received signal after DFT.

To start with, the single-box case is considered, i.e. the case in which the signal is received in only one time/frequency box.

It is assumed that there are P sensors available and that for each m from 1 to M, R sensors are sampled at the frequency $f_m$.

It will be noted that the number R is chosen independently of m in order not to complicate the notations used. This situation is in no way limiting and a sensor structure with R dependent on m could be envisioned without modifying the following reasoning.

Let: $MR = Q \leq MP$.

Each sensor is therefore indexed by two indices, an index m indicating the type of sampling, where m is an integer comprised between 1 and M, and an index r indicating the number of a sensor sampled at the frequency $f_m$, where r is an integer comprised between 1 and R.

After sampling and Fourier transform, and after the time/frequency box corresponding to a given frequency $f_0$ of the analyzed band B has been selected for the various samples, the signal received for given m, r may be written in the form:

$$x_{mr} = \alpha e^{i\varphi_{mr}} + b_m e^{i\psi_{mr}} + w_{mr} \text{ with } |\alpha| \geq 0, |b_m| \geq 0 \quad \text{(equation 1)}$$

where: a, a complex number, is the contribution of the useful signal. If this signal is present $|\alpha| > 0$,
$\varphi_{m,r}$ is the interferometric phase shift of the sensor of indices (m, r) with respect to an unspecified sensor, for a plane wave (i.e. the useful signal) coming from a direction $(\theta, \varphi)$,
$b_m e^{i\psi_{mr}}$ is the possible contribution of a parasitic signal observed only at $m = m_0$ because of spectral aliasing (with its interferometric phase shifts), and
$w_{mr}$ is the thermal noise that is assumed to be white for m and for r, with $E(|w_{mr}|^2) = 2\sigma^2$ for all m and r.

The model of equation 1 contains many parameters. This makes it complicated to optimize detection of the useful signal and to determine the situation as regards parasitic signals. As it is not possible to take into account all these parameters, a statistical model in which the measurements of the received signal are samples of a random variable is used instead.

It is chosen not to construct a detector adapted to each direction of the useful signal nor one adapted to each direction of the possible parasitic signal. Consideration is limited to processes that are good on average as regards the directions of arrival of the incident waves. On account of array factors affecting the interferometric phase shifts, it is possible to demonstrate that this amounts to embedding the model of equation 1 in a family of models in which the phase shifts $\varphi_{mr}$ and $\psi_{mr}$ are considered to be independent of m,r and equally distributed over the interval $[0, 2\pi[$. This makes it possible to simplify the probability density of the measurements of equation 1.

Despite this generalization, many parameters remain, especially as regards the density of the sensors sensing parasitic signals. For this reason, the processing is limited to the behavior of the 2nd order of the model. This amounts to considering $x_{mr}$ to be Gaussian. Therefore, under the aforementioned conditions, equation 1 yields:

$E(x_{mr}) = 0$ for all $m, r$;

$E(x_{mr} \bar{x}_{m^1, r^1}) = (|\alpha|^2 + 2\sigma^2) \delta_{mrm^1, r^1}$ if $m \neq m_0$ $E(x_{mr} \bar{x}_{m^1, r^1}) = (|\alpha|^2 + 2\sigma^2) \delta_{m_0 rm^1, r^1} + |b|^2 \delta_{m_0 rm^1, r}$ if $m = m_0$ where $$\delta_{mrm'r'} = \begin{cases} 1 & \text{if } m = m' \text{ and } r = r' \\ 0 & \text{if } m \neq m' \text{ and } r \neq r' \end{cases}$$

Below the following notations will be used:
$|\alpha|^2 = 2\sigma'^2$ = power of the useful signal
$|b|^2 = 2\sigma_1^2$ = power of the possible parasitic signal The probability density of the measurements $x_{mr}$ is of interest for $m = 1, 2, \ldots M$ and $r = 1, 2, \ldots R$ in the case where the useful signal is present and the parasitic signal present at $m_0$.

Let $X_m = (x_{m,r})^T$ be a vector of dimension R.

For $m \neq m_0$, the $X_m$ are independent complex centered Gaussians of covariance $2(\sigma'^2 + \sigma^2)I$ where I is a unit matrix of dimension R.

For $m = m_0$, $X_{m0}$ is a complex centered Gaussian that is independent of $X_{m, m \neq m_0}$ and of covariance $2(\sigma'^2 + \sigma_1^2 + \sigma^2)I$.

Finally:

$$p(x_1, x_2, \ldots, x_M) = \quad \text{(equation 2)}$$

$$\frac{1}{(2\pi)^{MR}(\sigma'^2 + \sigma^2)^{(M-1)R}(\sigma'^2 + \sigma_1^2 + \sigma^2)^R} \cdot$$

$$\exp\left(-\frac{\|X_{m_0}\|^2}{2(\sigma'^2 + \sigma_1^2 + \sigma^2)}\right) \exp\left(-\sum_{m \neq m_0} \frac{\|X_m\|^2}{2(\sigma'^2 + \sigma^2)}\right)$$

The measurement densities are obtained when the signal is absent by setting $\sigma'^2 = 0$ in equation 2 or when the parasitic signal is absent by setting $\sigma_1^2 = 0$.

Below, the density p(.) will be denoted as follows:

Signal present, parasitic signal absent: $p_{10}(.)$

Signal present, parasitic signal at $m_0$: $p_{11m_0}(.)$

Signal absent, parasitic signal absent: $p_{00}(.)$

Signal absent, parasitic signal at $m_0$: $p_{01m_0}(.)$    (equation 3)

To complete the model, the probability of a parasitic signal occurring is considered to be $1-\alpha$. This parameter may be estimated from the average signal density.

In order to simplify the equations, the following notations will be adopted:

$Q = M.R$ and $y_m^2 = \|X_m\|^2 / 2\sigma^2$.

It will also be noted that:

$$\begin{cases} -\dfrac{1}{2(\sigma'^2 + \sigma_1^2 + \sigma^2)} + \dfrac{1}{2(\sigma'^2 + \sigma^2)} = \dfrac{\sigma_1^2}{2(\sigma'^2 + \sigma^2)(\sigma'^2 + \sigma_1^2 + \sigma^2)} \\ -\dfrac{1}{2(\sigma'^2 + \sigma^2)} + \dfrac{1}{2(\sigma^2)} = \dfrac{\sigma'^2}{2(\sigma^2)(\sigma'^2 + \sigma^2)} \\ -\dfrac{1}{2(\sigma_1^2 + \sigma^2)} + \dfrac{1}{2(\sigma^2)} = \dfrac{\sigma_1^2}{2(\sigma^2)(\sigma_1^2 + \sigma^2)} \end{cases}$$ 
(equation 4)

It is sought to define a detection test, i.e. to decide whether a useful signal is absent or present, for each frequency $f_0$ of the band B, at the pitch $\Delta F$ of the DFT analysis. The detection test is applied to the probability densities of the measurements firstly assuming the presence of a signal+possible parasitic signal+noise (hypothesis $H_1$) and secondly assuming the absence of a useful signal but the presence of the possible parasitic signal+noise (hypothesis $H_0$). These densities are mixtures of densities corresponding to the simplest situations: signal+noise, signal+parasitic signal for the sample $m_0$+noise; noise alone, noise+parasitic signal for the sample $m_0$.

In order to make it easier to write out the probability densities, the densities with respect to the measurement induced by noise alone will be used below. This amounts to considering the probability densities divided by $p_{00}(.)$. This changes nothing as regards subsequent processing. In addition, in order not to needlessly complicate the notations used, the density denominations presented above in equation 3 will be preserved.

After calculation, the four following new expressions are obtained with the notation $y_m^2$:

$$p_{10}(y_1^2, \ldots, y_M^2) = \left(\frac{\sigma^2}{\sigma'^2 + \sigma^2}\right)^Q \exp\left(\frac{\sigma'^2}{\sigma'^2 + \sigma^2} \sum_m y_m^2\right)$$
(equation 5)

$$p_{11m_0}(y_1^2, \ldots, y_M^2) = \frac{\sigma^{2Q}}{(\sigma'^2 + \sigma^2)^{Q-R}} \exp\left\{\frac{\sigma'^2}{\sigma'^2 + \sigma^2} \sum_m y_m^2 + \frac{\sigma_1^2 \sigma^2}{(\sigma'^2 + \sigma^2)(\sigma'^2 + \sigma_1^2 + \sigma^2)} y_{m_0}^2\right\}$$
(equation 6)

$$p_{00}(y_1^2, \ldots, y_M^2) = 1$$    (equation 7)

$$p_{01m_0}(y_1^2, \ldots, y_M^2) = \frac{\sigma^{2R}}{(\sigma_1^2 + \sigma^2)^R} \exp\left(\frac{\sigma_1^2}{\sigma_1^2 + \sigma^2} y_{m_0}^2\right)$$
(equation 8)

Under hypothesis $H_1$ and hypothesis $H_0$, the probability density is a mixture of elementary densities; for $H_1$: $p_{10}(.)$ and $p_{11m_0}(.)$; for $H_0$: $p_{00}(.)$ and $p_{01m_0}(.)$. The coefficients of the mixture are $\alpha$ (absence of parasitic signal) and $$\frac{1-\alpha}{M}$$

(presence of parasitic signal at $m_0$).

The likelihood ratio, which is the result of dividing the probability density in $H_1$ by the probability density in $H_0$, may be written in the form:

$$L(y_1^2, \ldots, y_M^2) =$$    (equation 9)

$$\frac{\alpha p_{10}(y_1^2, \ldots, y_M^2) + \dfrac{1-\alpha}{M} \sum_{m_0=1}^{M} p_{11m_0}(y_1^2, \ldots, y_M^2)}{\alpha + \dfrac{1-\alpha}{M} \sum_{m_0=1}^{M} p_{01m_0}(y_1^2, \ldots, y_M^2)}$$

If all the parameters of the model: $\alpha, \sigma'^2, \sigma_1^2$ ($\sigma^2$ will be assumed known) were known, the optimal test for distinguishing the hypothesis $H_1$ from the hypothesis $H_0$ would consist in comparing $L(y_1^2, \ldots, y_M^2)$ to a preset threshold value ($L(y_1^2, \ldots, y_M^2) >$ or $<$ threshold).

The following notations will be used:

$$\beta = \frac{\sigma'^2}{\sigma'^2 + \sigma^2}, \gamma = \frac{\sigma_1^2 \sigma^2}{(\sigma'^2 + \sigma^2)(\sigma'^2 + \sigma_1^2 + \sigma^2)};$$ (equation 10)

$$\delta = \frac{\sigma_1^2}{(\sigma_1^2 + \sigma^2)}$$

On account of equations 5, 6, 8 and 10, the likelihood ratio of equation 9 may be written:

$$L(.) = \left(\frac{\sigma'^2}{\sigma'^2 + \sigma^2}\right)^Q \exp\left(\beta \sum_m y_m^2\right)$$ (equation 11)

$$\left[\frac{1 + \dfrac{1-\alpha}{\alpha M}\left(\dfrac{\sigma'^2 + \sigma^2}{\sigma'^2 + \sigma_1^2 + \sigma^2}\right)^R \sum_m \exp(\gamma y_m^2)}{1 + \dfrac{1-\alpha}{\alpha M}\left(\dfrac{\sigma^2}{\sigma_1^2 + \sigma^2}\right)^R \sum_m \exp(\delta y_m^2)}\right]$$

The various terms between square brackets in equation 11 are not of the same order of magnitude and this makes simplifications possible.

To give an idea, the following values will be considered: $\alpha = 0.9$, $M = 4$, $\sigma'^2/\sigma^2 = 10$, $\sigma'^2 = \sigma_1^2$ and $R = 2$.

Therefore: $\gamma \approx 1/20$; $\delta \approx 1$ and $\beta \approx 1$

For $y_m^2 = 0$, independently of the value of m:

$$\frac{1-\alpha}{\alpha M}\left(\frac{\sigma'^2 + \sigma^2}{\sigma'^2 + \sigma_1^2 + \sigma^2}\right)^R \sum_m \exp(\gamma y_m^2) = \frac{0.1}{0.9 \times 4}\left(\frac{1}{2}\right)^R \ll 1$$

-continued $$\frac{1-\alpha}{\alpha M}\left(\frac{\sigma^2}{\sigma_1^2+\sigma^2}\right)^R \sum_m \exp(\delta y_m^2) = \frac{0.1}{0.9\times 4}\left(\frac{1}{10}\right)^R \ll 1$$

That is: $y^2 = \operatorname{Max}_m y_m^2$

1)

$$\frac{1-\alpha}{\alpha M}\left(\frac{\sigma'^2+\sigma^2}{\sigma'^2+\sigma_1^2+\sigma^2}\right)^R \sum_m \exp(\gamma y_m^2) \le \frac{1-\alpha}{\alpha}\left(\frac{\sigma'^2+\sigma^2}{\sigma'^2+\sigma_1^2+\sigma^2}\right)^R \exp(\gamma y^2)$$

This majorant reaches the value 1 for $$y^2 = \frac{1}{\gamma}\ln\frac{\alpha}{1-\alpha} + \frac{R}{\gamma}\ln\left(\frac{\sigma'^2+\sigma_1^2+\sigma^2}{\sigma'^2+\sigma^2}\right) = 20\ln 9 + 20R\ln 2 = 44 + 14R$$

2)

$$\frac{1-\alpha}{\alpha M}\left(\frac{\sigma^2}{\sigma_1^2+\sigma^2}\right)^R \sum_m \exp(\delta y_m^2) < \frac{1-\alpha}{\alpha}\left(\frac{\sigma^2}{\sigma_1^2+\sigma^2}\right)^R \exp(\delta y^2)$$

This majorant reaches the value 1 for $$y^2 = \frac{1}{\delta}\ln\frac{\alpha}{1-\alpha} + \frac{R}{\delta}\ln\left(\frac{\sigma_1^2+\sigma^2}{\sigma^2}\right) = \ln 9 + R\ln 10 = 2.2 + 2.3R$$

It may be deduced from these two calculations that the probability that the term in $$\frac{1-\alpha}{M}\ldots$$

in the numerator of equation 11 reaches 1 is almost zero. In contrast, this is not the case for the denominator.

Equation 11 may therefore be written in the simplified form:

$$L(.) = \left(\frac{\sigma^2}{\sigma'^2+\sigma^2}\right)^Q \exp\left(\beta\sum_m y_m^2\right)\left[\frac{1}{1+\frac{1-\alpha}{\alpha M}\left(\frac{\sigma^2}{\sigma_1^2+\sigma^2}\right)^R \sum_m \exp(\delta y_m^2)}\right]$$ (equation 12)

Two observations may be made:
1) as $L(.)$ will need to be compared to a threshold value to form the detection test, the constant (but unknown) factor $$\left(\frac{\sigma^2}{\sigma'^2+\sigma^2}\right)^Q$$

will have no effect either on the probability of false alarm or on the probability of detection; it may therefore be removed without harm (the notation $L(.)$ will be kept).

2) the signal-to-noise ratio $\sigma'^2/\sigma^2$ is typically higher than 10 dB (likewise for $\sigma_1^2/\sigma^2$), and hence $\beta\approx 1$ and $\delta\approx 1$.

After these simplifications, if $$\xi = \frac{1-\alpha}{\alpha}\left(\frac{\sigma^2}{\sigma_1^2+\sigma^2}\right)^R$$

is posited, the test at present considered to be "optimal" becomes:

$$L(.) = \exp\left(\sum_m y_m^2\right)\left[\frac{1}{1+\frac{\xi}{M}\sum_m \exp(\delta y_m^2)}\right]$$ (equation 13)

After the logarithm of equation 13 has been taken, the following test is obtained:

$$l(y_1^2,\ldots,y_M^2) = \ln L(y_1^2,\ldots,y_M^2)$$ (equation 14)

$$l(y_1^2,\ldots,y_M^2) =$$

$$\sum_m y_m^2 - \ln\left[1 + \frac{\xi}{M}\sum_m \exp y_m^2\right] > \text{or} < \text{threshold}$$

The test of equation 14 depends only on the parameter $\xi$, and may be optimized in Pd/Pfa (where Pd is the detection probability and Pfa the probability of false alarm) in the vicinity of a parasitic-signal situation defined for $\alpha$ and $\sigma_1^2/\sigma^2$): it is enough to replace $\xi$ by its expression in $\alpha$ and $\sigma_1^2/\sigma^2$).

The test is a symmetric function of the $y_m^2$ (symmetry of the parasitic-signal situations).

It may be noted that in the case where no parasitic signal is present, i.e. $\alpha=1$ which leads to $\xi=0$, a quadratic detector is again obtained.

The detector of equation 14 is not very complicated; nevertheless as regards computational speed, the presence of the $\ln(.)$ and $\exp(.)$ functions is disadvantageous. It would therefore be better to carry out the test of equation 14 with a simpler function that is independent of $\xi$.

(*) If $y_m^2$ is small, i.e. $y_m^2$ is very much less than 1 independently of m.

In this case, as $0\le\xi\le 1$ and $y_m^2\le 1$, equation 14 may be written, after limited expansion of the exponential function and of the logarithm function, in the form:

$$l(y_1^2,\ldots,y_M^2) \approx \sum_m y_m^2 - \frac{\xi}{M}\sum (1+y_m^2)$$ (equation 15)

$$\approx \sum_m y_m^2 - \xi$$

(*) If $y_m^2$ is large (i.e. $y_m^2 > 1$) independently of m with all the $y_m^2$ more or less equal.

In this case, $$\frac{\xi}{M} \sum_m \exp y_m^2$$

is preponderant before 1 in equation 14.

This time let us write $$y^2 = \frac{1}{M} \sum_m \exp y_m^2$$

and $y_m^2 = y^2 + \Delta y_m^2$; ($|\Delta y_m^2| \ll 1$), so that $$\sum_m \Delta y_m^2 = 0.$$

With this approximation and this notation, equation 14 becomes:

$$\sum_m y_m^2 - \ln\left[\frac{\xi}{M} \exp y^2 \cdot \sum_m \exp(\Delta y_m^2)\right] =$$

$$\sum_m y_m^2 - \ln \xi - y^2 - \ln\left[\frac{1}{M} \sum_m \exp(\Delta y_m^2)\right]$$

After limited expansion of the exponential the following is obtained:

$$\frac{1}{M} \sum_m \exp(\Delta y_m^2) \approx \frac{1}{M}[M + \sum y_m^2] \approx 1.$$

Thus, in the zone considered here:

$$l(y_1^2, \ldots, y_M^2) \approx \left(1 - \frac{1}{M}\right) \cdot \sum_m y_m^2 - \ln \xi \quad \text{(equation 16)}$$

(*) If $y_{m_0}^2 \gg y_m^2$ for $m \neq m_0$ (presence of a parasitic signal for the sensors of index $m_0$ sampled at $f_{m_0}$), the term $$\frac{\xi}{M} \sum_m \exp y_{m_0}^2$$

alone is preponderant with respect to 1 in equation 14, this equation may therefore be approximated by:

$$l(y_1^2, y_2^2, \ldots, y_M^2) \approx \quad \text{(equation 17)}$$

$$\sum_m y_m^2 - \ln\left[\frac{\xi}{M} \cdot \exp y_{m_0}^2 \cdot \left(1 + \sum_{m \neq m_0} \exp(y_m^2 - y_{m_0}^2)\right)\right].$$

As $y_m^2 - y_{m_0}^2 \ll 0$: $l(y_1^2, y_2^2, \ldots, y_M^2) \approx$ $$\sum_m y_m^2 - y_{m_0}^2 - \ln\left(\frac{\xi}{M}\right)$$

$$l(y_1^2, y_2^2, \ldots, y_M^2) \approx \sum_m y_m^2 - \text{Max}_m y_m^2 - \ln\left(\frac{\xi}{M}\right)$$

The formulae of equations 15, 16 and 17 are approximations of $l(y_1^2, y_2^2, \ldots, y_M^2)$ in the main zones of the domain of the $\{y_1^2, y_2^2, \ldots y_M^2\} = (\Re^+)^M$, corresponding to the following physical situations:

1) absence of parasitic and useful signal;
2) presence of useful signal without parasitic signal;
3) presence of a parasitic signal.

By virtue of these approximations, it will be possible to simplify the test of equation 14.

Let $D = \{(y_1^2, y_2^2, \ldots y_M^2) \in (\Re^+)^M$ such that $l(y_1^2, y_2^2, \ldots y_M^2) > s\}$ and $D^C$ be its complement in $(\Re^+)^M$. D contains the zone(s) in which at least one $y_{m_0}^2$ is large ($y_{m_0}^2 > 1$) i.e. the test may be approximated by equation 16 for large $y_m^2$ that are all more or less equal and by equation 17 for large $y_{m_0}^2$ among $y_m^2$, $m \neq m_0$.

By observing whether $$\frac{1}{M} \sum_{m=1}^M y_m^2 \approx \max y_m^2$$

when all the $y_m^2$ are similar, it may be seen that is possible to propose:

$$l'(y_1^2, y_2^2, \ldots, y_M^2) = \sum_{m=1}^M y_m^2 - \max_m y_m^2$$

as a test function that approaches $l(.)$ in the two most important zones of D. The other subdomains of D are not very heavily loaded by the probability densities.

It will be noted that the term $\ln M$ is not taken into account, but it is negligible. In addition, the addition of the term $\ln \xi$ to the detectors of equations 16 and 17 is of no importance because the performance of a test is not affected by additive terms.

Therefore, it is proposed to use by way of simplified test:

$$\sum_{m=1}^M y_m^2 - \max_m y_m^2 < \text{or} > \text{threshold} \quad \text{(equation 18)}$$

By comparing equation 15 and equation 18, will be noted that the approximation is not perfect in the domain in which all the $y_m^2$ are small. This approximation amounts to adding the term $$\xi - \ln \xi - \text{Max}_M y_m^2$$

to the detector of equation 15.

ξ, which is small, and $$-\underset{M}{\text{Max }} y_m^2,$$

which is a negative, are no problem. In contrast the term ln ξ is positive and is not always negligible with respect to $$\sum_{m=1}^{M} y_m^2.$$

Therefore, the approximation is not perfect. This is the price that must be paid to obtain a simple and universal expression for the test. Simulations have demonstrated that the sensitivity difference between the two detection methods is less than 2 dB.

Attention is now turned to the multi-box case in which the received signals extend over a window composed of N time/frequency boxes indexed by n (where n is an integer comprised between 1 and N) for the MR reception channels corresponding to the samples of frequency $f_m$ (where m is an integer varying from 1 to M) and the sensors r (where r is an integer varying from 1 to R) associated with each sampling frequency $f_m$ (as for the single-box case).

The same general requirement of finding a detection test that is good on average whatever the direction of the useful and parasitic signals is still valid. The difference with respect to the single-box case is that the fluctuating character of the useful signal from one time/frequency box to the next, or even the possible absence of the useful signal, must be taken into account.

If the model of the received signal expressed in equation 1 is reused with the addition of the time/frequency box index n, the following is obtained:

$$x_{mrn} = a_n e^{i\varphi_{mr}} + b_{mn} e^{i\psi_{mrn}} + w_{mrn}.$$

In this equation:
- $a_n$ is complex and represents the useful signal received by a reference sensor.
- the $\varphi_{mr}$ are the expression of the interferometric phase shifts.
- $b_{mn}$ is complex and for each index n, at most one single $b_{mn}$ is different from 0.

This models the fact that only a single sample will contain a parasitic signal, this sample possibly changing randomly as function of n.
- $\psi_{mrn}$ is the interferometric phase shift of the parasitic signal.
- $w_{mrn}$ is the noise on the sensor mr for the box n. $\{w_{mrn}\}$ forms a series of centered independent Gaussian random variables of the same variance $2\sigma^2$.

The useful signal $a_n$ is modelled as follows: $a_n=0$ with the probability $(1-q)$, and $a_n$ is a sample of a centered Gaussian random variable of variance $2\sigma'^2$ with the probability q. The samples $\alpha_n$ are independent of n.

To obtain a detection test that is good on average for all the directions of arrival of the signal and parasitic signal, it is proposed to limit consideration to statistics of the second order when the signal and/or parasitic signal is present. The probability that the box n will contain, for a certain sample $m_0$, a parasitic signal will be called $1-\alpha$ and the power of said parasitic signal will be denoted $2\sigma_1^2$.

In the case where the signal and parasitic signal are present in the sample $m_0$, the probability density of the M vectors of dimension R representing all of the measurements of the box n is written, as in equation 2 for the monosource case (here the index n is omitted in order not to complicate matters):

$$p(x_1, x_2, \ldots, x_M) = \qquad \text{(equation 19)}$$

$$\frac{1}{(2\pi)^{MR}(\sigma'^2+\sigma^2)^{(M-1)R}(\sigma'^2+\sigma_1^2+\sigma^2)^R} \cdot$$

$$\exp\left(-\frac{\|X_{m_0}\|^2}{2(\sigma'^2+\sigma_1^2+\sigma^2)}\right)\exp\left(-\sum_{m\ne m_0}\frac{\|X_m\|^2}{2(\sigma'^2+\sigma^2)}\right)$$

By reasoning as in the single-box case, the probability densities $p_{10}, p_{11m_0}, p_{00}, p_{01m_0}$ are defined and all these densities are divided by $p_{00}$ (signal absent, parasite signal absent) so as to obtain simpler expressions. This amounts to taking the probability densities with respect to the measurement induced by the pure noise model. Below, $p_{10}, p_{11m_0}, p_{01m_0}$ after division by $p_{00}$ will be spoken of.

In the case where a useful signal is present, the probability density is:

$$\alpha \cdot p_{10} + \frac{1-\alpha}{M}\sum_{m_0=1}^{M} p_{11m_0}$$

When the signal is not present the probability density becomes:

$$\alpha + \frac{1-\alpha}{M}\sum_{m_0=1}^{M} p_{01m_0}$$

It is possible to deduce therefrom the density of $(X_1, X_2, \ldots, X_M)$ for a box under hypothesis $H_1$:

$$p_1(X_1, X_2, \ldots, X_M) = q\left(\alpha \cdot p_{10} + \frac{1-\alpha}{M}\sum_{m_0=1}^{M} p_{11m_0}\right) + \qquad \text{(equation 20)}$$

$$(1-q)\left(\alpha + \frac{1-\alpha}{M}\sum_{m_0=1}^{M} p_{01m_0}\right)$$

$p_0(X_1, X_2, \ldots, X_M)$, the density of the measurements of box n, may be deduced therefrom by setting q=0 in equation 20:

$$p_0(X_1, X_2, \ldots, X_M) = \alpha + \frac{1-\alpha}{M}\sum_{m_0=1}^{M} p_{01m_0} \qquad \text{(equation 21)}$$

The independence of the signals on n, and the independence of the parasitic-signal situations, give for the probability densities of the measurements for all the boxes, under hypothesis $H_1$ or hypothesis $H_0$ $$p'_1(X_{11}, \ldots, \ldots, X_{M1}, X_{12}, \ldots, X_{M2}, \ldots, X_{1N}, \ldots, X_{MN}) = \prod_{n=1}^{N} p_1(X_{1n}, X_{2n}, \ldots, X_{MN})$$ (equation 22)

$$p'_0(X_{11}, \ldots, \ldots, X_{M1}, X_{12}, \ldots, X_{M2}, \ldots, X_{1N}, \ldots, X_{MN}) = \prod_{n=1}^{N} p_0(X_{1n}, X_{2n}, \ldots, X_{MN})$$ (equation 23)

As may be seen by virtue of equation 19, the densities of equations 22 and 23 depend on $\|X_{mn}\|^2/2\sigma^2$, which will be denoted $y_{mn}^2$ below.

The likelihood ratio is expressed by the quotient of the densities $p_1^1/p_0^1$.

If all the parameters $\sigma^{12}, q, \alpha, \sigma_1^2$ of the model were known, the optimal test in the Neyman-Pearson sense to decide whether a useful signal was present would be to compare this likelihood ratio to a threshold value.

In the absence of this knowledge, the terms of the likelihood ratio are evaluated in order to deduce therefrom a test that is practically optimized in the vicinity of the operating point that is of interest to us.

With simplified notations the following is obtained:

$$\ln \frac{p'_1}{p'_0} = \sum_{n=1}^{N} \ln \frac{p_1}{p_0}$$

Moreover, by virtue of equations 20 and 21:

$$\frac{p_1}{p_0} = 1 - q + q \frac{\alpha p_{10} + \frac{1-\alpha}{M} \sum_{m_0=1}^{M} p_{11m_0}}{\alpha + \frac{1-\alpha}{M} \sum_{m_0=1}^{M} p_{01m_0}}$$ (equation 24)

The likelihood ratio of the single-box problem, denoted $L(y_{1n}^2, y_{2n}^2, \ldots, y_{Mn}^2)$ or $L_n$ for short, will be recognized:

$$\frac{p_1}{p_0} = 1 - q + qL_n$$

The test of the likelihood ratio is therefore:

$$\sum_{n=1}^{N} \ln(1 - q + qL_n) > \text{or} < \text{threshold}$$ (equation 25)

Reusing the same approximations as in the single-box case: $\sigma^{12}/\sigma^2 \gg 1, \sigma_1^2 \gg 1$, the same expression as in the single-box case is obtained (cf. equation 14):

$$L_n = \exp\left[\sum_m y_{mn}^2 - \ln\left(1 + \frac{\xi}{M} \sum_m \exp y_{mn}^2\right)\right],$$

which, inserted into equation 25, provides what may be called the "optimal test" dependent on the parameters $$\xi = \frac{1-\alpha}{\alpha}\left(\frac{\sigma^2}{\sigma_1^2 + \sigma^2}\right)^R \text{ and } q.$$

To go further with the simplification, let $L_n = \exp[l_n(y_{1n}^2, \ldots, y_{Mn}^2)]$. Therefore the behavior of the following will now be studied (cf equation 25)

$$\ln(1 - q + q\exp l_n)$$ (equation 26)

Then: $\ln(1-q+q\exp l) \approx \ln q + l$ if $l \to +\infty$
$\ln(1-q+q\exp l) \approx ql$ if $l \to 0$.

Figure 2:
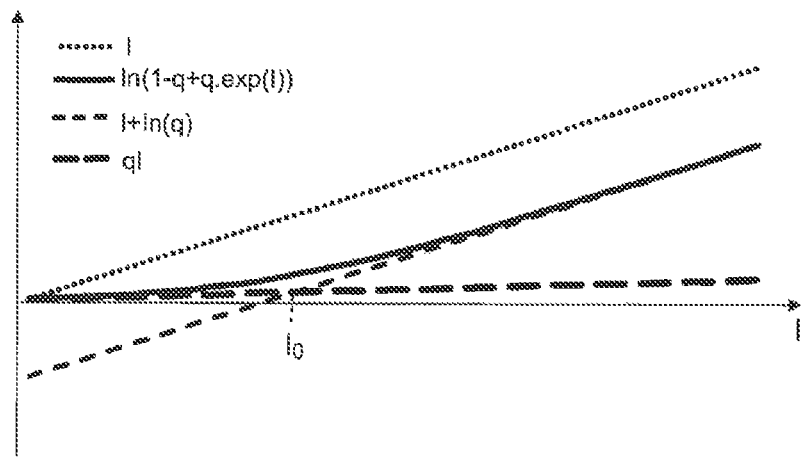
FIG. 2 shows an exemplary curve representative of the specific nonlinearity of the multi-box detector.

By way of illustration, FIG. 2 shows a curve representative of the detector and its asymptotes at $l=0$ and $+\infty$.

$l_0$ is defined by:

$$q \cdot l_0 = l_0 + \ln q \text{ or } l_0 = -\frac{\ln q}{1-q}.$$

If q is approximately known, it is possible to propose a simplification of the test of equation 25 to:

$$\sum_{n=1}^{N} \Lambda(l_n) > \text{or} < \text{threshold},$$

by reducing equation 26 to its asymptotic behaviors.

The non-linear function $\Lambda(l)$ may then be defined by:

$$\begin{cases} 0 \le l < l_0: & \Lambda(l) = ql \\ l_0 \le l: & \Lambda(l) = l + \ln q \end{cases}.$$

The non-linear function $\Lambda(l)$ may be represented by a monotonically increasing function the representative curve of which may be defined by its asymptotes, a first asymptote at $l=0$ having the equation $y=ql$ and a second asymptote for $l \to +\infty$ having the equation $y=l+\ln(q)$ where q is a real number comprised between 0 and 1: $0 < q \le 1$.

The latter expressions may be further simplified if the formula for l found in the single-box case is used:

$$l_n = \sum_{m=1}^{M} y_{mn}^2 - \max_m y_{mn}^2.$$

By way of example, FIGS. 3 to 6 illustrate possible steps of the detection method in the case where the received signal is sampled with as many different frequency values as there are sensors (M=P), i.e. one sampling frequency per sensor (R=1).

Figure 3:
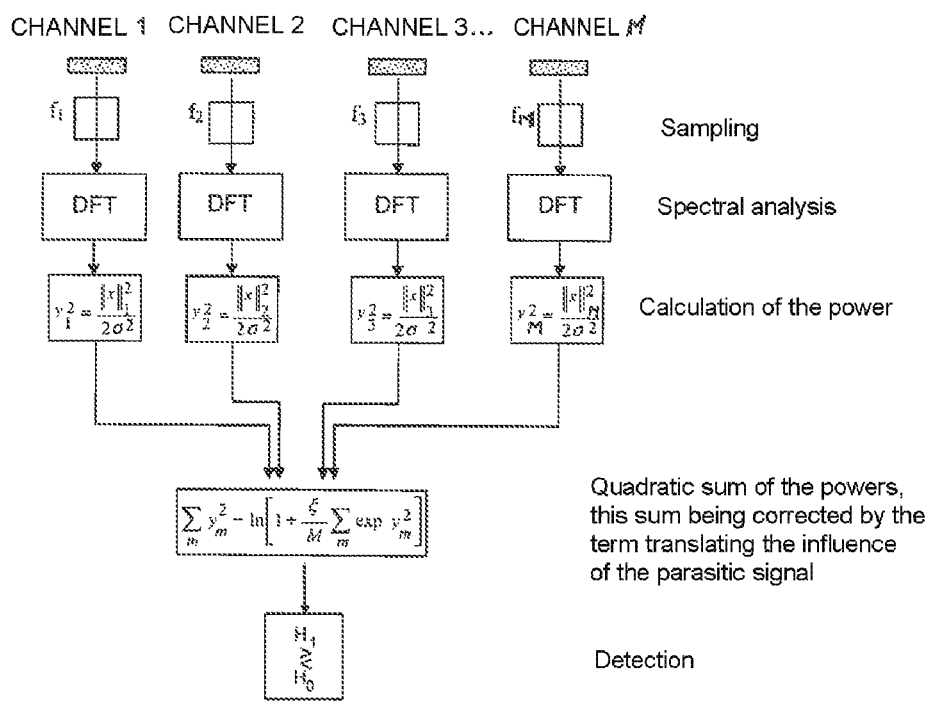
FIGS. 3 to 6 illustrate possible steps of the detecting method according to the invention in various situations.
Figure 4:
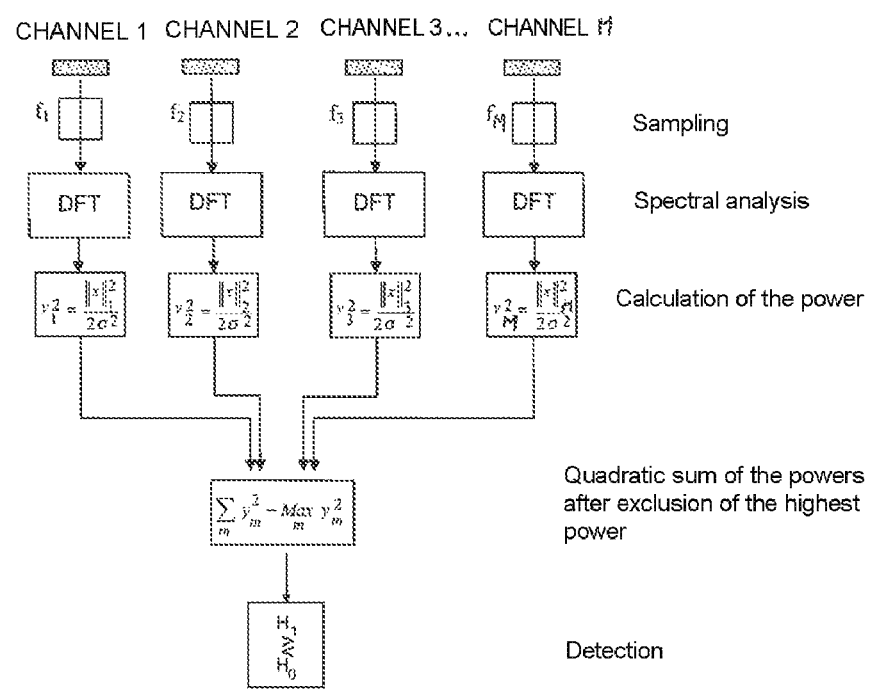
Figure 5:
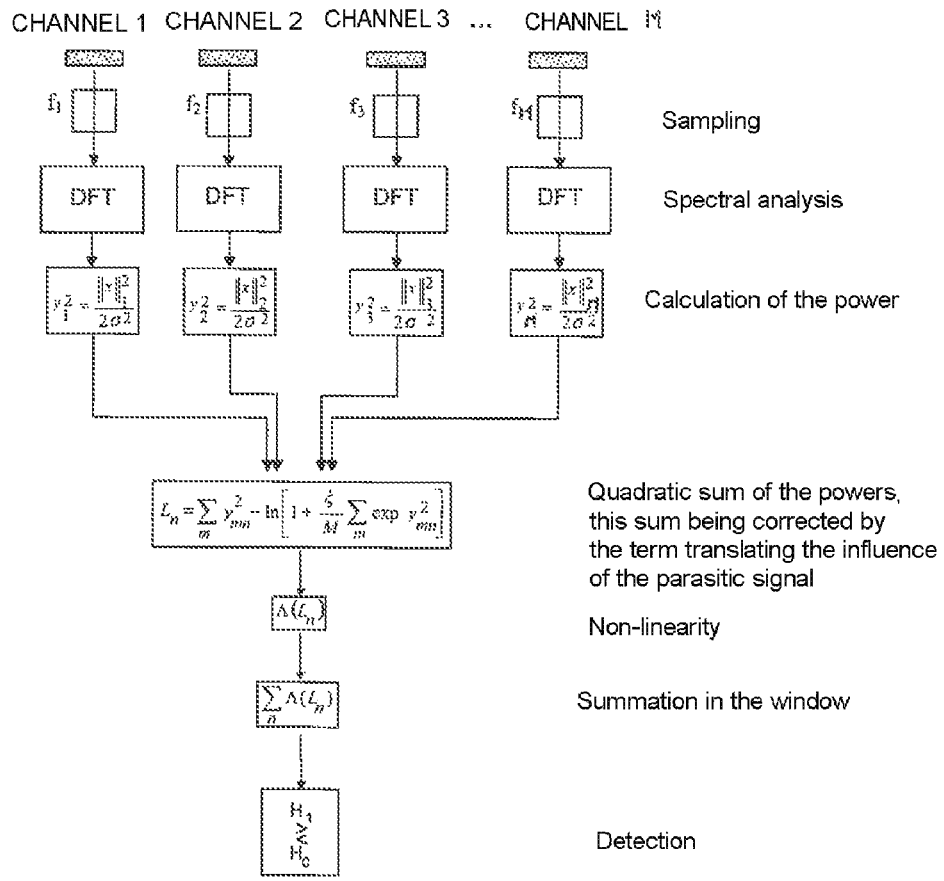
Figure 6:
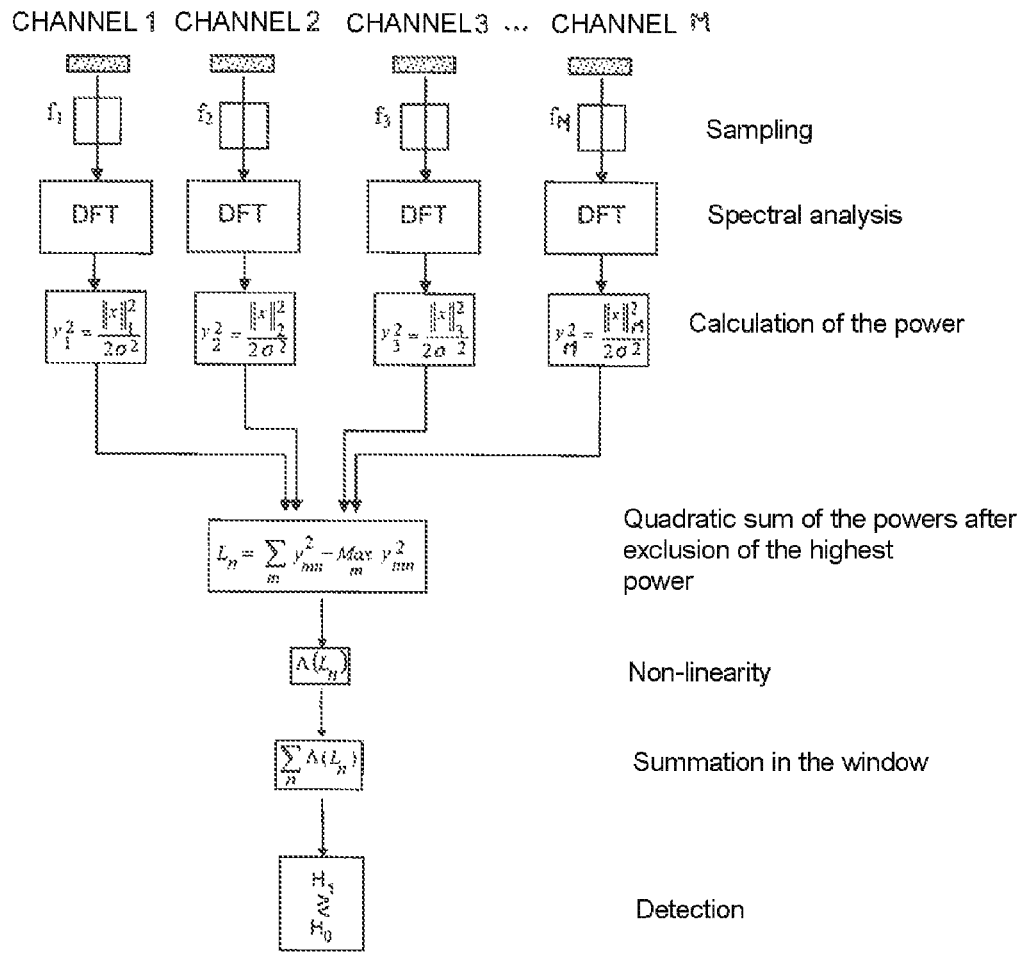

FIGS. 3 and 4 show the case of a single-box detection and FIGS. 5 and 6 the case of a multi-box detection.

In a first step, the signals received by each sensor of the receiver are sampled, over an acquisition time $\Delta T$, with frequencies $f_m$ of different value depending on the reception channel and not meeting the Nyquist criterion.

According to one embodiment, the signals received by each sensor are sampled during each time interval $$\left[k\frac{\Delta T}{2}, \left(\frac{k}{2}+1\right)\Delta t\right],$$

where k is an integer. Of course this embodiment is in no way limiting and other time intervals of duration ΔT may be chosen, such as for example [k·ΔT,(k+1)ΔT].

A discrete Fourier transform is then carried out on the sampled signals. As was seen above, the pairs ($N_m, f_m$), where fm is the sampling frequency and Nm the number of sampled points, are chosen such that $N_m \cdot T_m = \Delta T$. $\Delta F = 1/\Delta T$ is then the common spectral resolution of all the samples. The receiving channels are therefore synchronous at the period 1/ΔF and have the same channel width. Thus, a time/frequency representation of the signals is obtained.

The following step consists in calculating, for each time/frequency box of said discrete representation corresponding to a tested frequency $f_0$, the normalized power of each sample by quadratic summation of the powers of all the receiving channels sharing a given sampling frequency $f_m$. This power may be calculated using the formula $$y_m^2 = \frac{\|X_m\|^2}{2\sigma^2} = \frac{\sum_{r=1}^{R} |X_{mr}|^2}{2\sigma^2},$$

which was seen above and in which R is an integer representing the number of channels sampled at the frequency $f_m$. In our example R=1.

Next the quadratic sum of the calculated powers of all the samples in each time/frequency box is calculated while taking into account the power of a possible parasitic signal.

The power of the possible parasitic signal may be taken into account in various ways.

FIG. 3 illustrates the optimal test for the detection method in the case where the signals are received only in one time/frequency box. In this case, the influence of the parasitic signal is allowed for by subtracting the term $$\ln\left[1 + \frac{\xi}{M}\sum_m \exp y_m^2\right]$$

as seen above, especially with equation 14. In this expression, ξ translates the possible presence of a parasitic signal in one of the samples and is given by $$\xi = \frac{1-\alpha}{\alpha}\left(\frac{\sigma^2}{\sigma_1^2 + \sigma^2}\right)^R.$$

The parameter $\sigma^2$ is assumed known (it may be obtained by calibration), the parameter α is calculated from the density of the signals to be intercepted, and the parameter $\sigma_1^2$ is adjusted to the minimum power of the parasitic signals from which it is desired to provide protection, which power is assumed to be of the same order of magnitude as the minimum power of the signals of interest.

A thresholding step is then applied to each time/frequency box using a preset threshold value. This threshold value is determined so as to achieve a given probability of false alarm.

FIG. 4 shows a simplified version of the test. In this version, the detecting algorithm initially assumes that the power of highest value corresponds to the power of a parasitic signal. From the calculated power values, the highest is sought so as to exclude it. The quadratic sum of the powers is thus taken with the M−1 remaining values.

This simplified detection method systematically removes one sampling channel, even if the power of the signal is low in all the channels.

Differently, the optimal method illustrated in FIG. 3 has a behavior that adapts to the power of the received signal, ranging from removing the sampling channel having the highest power, if the latter is very highly preponderant with respect to the others, to a behavior similar to a quadratic detector in all the channels, if the power received in all the channels is substantially similar.

The simplified detection method has the advantage of being easier to implement and of being independent with respect to unknown parameters, at the price of a moderate degradation in performance.

FIG. 5 shows possible steps of the optimal detection method in the case where the signal is received in a plurality of time/frequency boxes. The signal is considered to be received in a window of N time/frequency boxes.

As for the case of the single-box optimal method, the multi-box optimal method calculates the normalized power in each sampling channel and in each time/frequency box, then the quadratic sum of the powers of all the samples in each time/frequency box and subtracts a term translating the power of the parasitic signal.

It then applies a non-linear function Λ to each time/frequency box then sums the results for the N time/frequency boxes of the window.

The method ends with a thresholding step using a preset threshold value. This threshold value may be determined so as to achieve a given probability of false alarm.

FIG. 6 illustrates the simplified version of the test of the detection method in the multi-box case. In this configuration, the quadratic sum is calculated while excluding the power that is of highest value among the sampling channels.

As above, a non-linear function Λ is then applied to each time/frequency box then the result is summed for the N time/frequency boxes of the window in which the signals are analyzed.

The method ends with a thresholding step using a preset threshold value.

Advantageously, the sub-Nyquist sampling method according to the invention allows a complete and instantaneous picture of the entire band of the signals to be obtained. The detection test is robust to the presence of parasitic signals, i.e. it is possible, for a set probability of false alarm, to find for this test a threshold value that is independent of the power of the parasitic signal.

With respect to the optimal detector in the absence of aliasing, i.e. the conventional quadratic detector, the equation of the detector according to the invention contains an additional term. In the presence of a high-power parasitic signal, the detector behaves like a quadratic detector for all the samples, the parasitic sample being excluded.

Another subject of the present invention is a receiver or passive detection device. This device comprises at least one receiving module and a computing module configured to implement the method described above. The receiving module is configured to receive electromagnetic signals from the environment and to transmit them to the computing module with a view to their processing.

The receiving module may comprise at least one antenna, or interferometer antenna array. The antenna comprises at least one sensor. The receiving module is configured to continuously receive electromagnetic signals over the entire analyzed frequency band.

The computing module is configured to at least be able to carry out two-or-more bit, sub-Nyquist sampling.

The computing module may be one or more microprocessors, processors, computers or any other equivalent opportunely programmed means.

The invention claimed is:

1. A method for passively detecting electromagnetic signals, robust to spectral aliasing and implemented by a device comprising an antenna, said antenna comprising P wideband sensors, where P is a nonzero integer, said method comprising:
- a step of sampling signals received by the P wideband sensors, during a common given acquisition time $\Delta T$, to provide M sampling channels, M being an integer higher than or equal to 2, the signal received by each of the P sensors being sampled using at least two different sampling frequencies among a set of M different sampling frequencies $f_m$, with m an integer index between 1 and M; said sampling frequencies not meeting the Nyquist criterion with respect to an analyzed frequency band B, each sampling frequency $f_m$ being used to sample the signals received on R sensors, R being an integer equal to or less than P; and to provide $N_m$ samples for the signal received on each of said R sensors, the samples provided for the signals received on the R sensors being gathered to form one of the M sampling channels, and
- a step of transforming each of the M sampling channels to a time/frequency domain by R discrete Fourier transforms of the $N_m$ sampled points of the signals received on each of the R sensors sampled at $f_m$ over a common time interval $\Delta T$, a common spectral resolution of all the discrete Fourier transforms being $\Delta F=1/\Delta T$,
- wherein, each sampling channel being presented in R time/frequency representations, the method further comprises, for each frequency $f_0$ of the analyzed frequency band B, a selection of the corresponding time/frequency box in each of said time/frequency representations,
- a step of calculating, for each time/frequency box selected in said time/frequency representations, the normalized power in each sampling channel expressed by the following relation:

$$y_m^2 = \frac{\sum_{r=1}^{R} |x_{mr}|^2}{2\sigma^2},$$

where:
$x_{mr}$ is a signal in the time/frequency box,
m is an index of the sampling frequency of the sampling channel,
r is an index of the sensor, and
$2\sigma^2$ is a power of noise;
- a step of calculating a quadratic sum of calculated normalized powers over all sampling channels and of correcting said quadratic sum by a correction term whose value depends on a power of a possible parasitic signal due to spectral aliasing, and
- a step of thresholding said quadratic sum using a preset threshold value.

2. The method as claimed in claim 1, wherein the corrected quadratic sum S of the powers is calculated using the formula:

$$S = \sum_{m=1}^{M} y_m^2 - \ln\left[1 + \frac{\xi}{M}\sum_{m=1}^{M} \exp y_m^2\right],$$

where: $y_m^2$ is the normalized power in the sampling channel of frequency $f_m$, and where $$\ln\left[1 + \frac{\xi}{M}\sum_{m=1}^{M} \exp y_m^2\right]$$

is a statistic correction term with $$\xi = \frac{1-\alpha}{\alpha}\left(\frac{\sigma^2}{\sigma_1^2 + \sigma^2}\right)^R,$$

$2\sigma_1^2$ is the power of the possible parasitic signal due to spectral aliasing,
$2\sigma^2$ is the power of the noise,
$\alpha$ is a probability of there being no parasitic signal due to spectral aliasing,
and R is the number of sensors sampled at the frequency $f_m$.

3. The method as claimed in claim 1, wherein the corrected quadratic sum of the powers is calculated using the formula:

$$\sum_{m=1}^{M} y_m^2 - \operatorname*{Max}_{m} y_m^2,$$

where: $y_m^2$ is a normalized power value in the sampling channel of frequency $f_m$, and
where the correction term $$\operatorname*{Max}_{m} y_m^2$$

is a highest power value among the m sampling channels.

4. The method as claimed in claim 1, wherein the signals are received in N time/frequency boxes where N is an integer strictly higher than 1, the method further comprising:
- a step of applying a non-linear function to each time/frequency box, and
- a step of summing results obtained in the N time/frequency boxes.

5. The method as claimed in claim 4, wherein the non-linear function is a monotonically increasing function, a representative curve of which is defined by its asymptotes y, a first asymptote at l=0 having an equation y=ql and a second asymptote for l→+∞ having an equation y=l+ln(q), where q is a real number comprised between 0 and 1.

6. The method as claimed in claim 1, wherein the threshold value is defined so as to ensure a preset probability of false alarm.

7. A passive detection device comprising a receiving module with an antenna comprising P wideband sensors, where P is a nonzero integer, and a computing module configured to implement the method as claimed in claim 1, said receiving module being configured to receive electromagnetic signals from an environment and to transmit them to the computing module for processing.

8. The device as claimed in claim 7, wherein the receiving module comprises an interferometer antenna array.

* * * * *